US008171890B2

(12) United States Patent
Foster

(10) Patent No.: US 8,171,890 B2
(45) Date of Patent: May 8, 2012

(54) JOINT STABILIZED STRAIGHT PLANE MOVEMENT STRETCHING METHOD

(75) Inventor: Sasha A. Foster, Fort Collins, CO (US)

(73) Assignee: Love Dogs. Stretch Dogs. LLC, Fort Collins, CO (US)

( * ) Notice: Subject to any disclaimer, the term of this patent is extended or adjusted under 35 U.S.C. 154(b) by 346 days.

(21) Appl. No.: 12/586,017

(22) Filed: Sep. 15, 2009

(65) Prior Publication Data

US 2010/0064984 A1 Mar. 18, 2010

Related U.S. Application Data

(60) Provisional application No. 61/192,054, filed on Sep. 15, 2008.

(51) Int. Cl.
*A01K 29/00* (2006.01)

(52) U.S. Cl. ........................................................ 119/712

(58) Field of Classification Search .................. 119/712, 119/756, 755, 174, 702; 601/53, 33
See application file for complete search history.

(56) References Cited

U.S. PATENT DOCUMENTS 5,472,410 A * 12/1995 Hamersly ........................ 602/16
6,599,255 B2 * 7/2003 Zhang ........................... 600/587

OTHER PUBLICATIONS

Foster, Sasha and Foster, Ashley, The Healthy Way to Stretch Your Dog a Physical Therapy Approach, Mar. 7, 2009, 201 pgs, Dogwise Publishing, Wenatchee, WA USA.

* cited by examiner

*Primary Examiner* — Yvonne Abbott
(74) *Attorney, Agent, or Firm* — Craig R. Miles; CR Miles, P.C.

(57) ABSTRACT

Generally, a joint stabilized planar motion stretching system for an animal. Specifically, a method of stretching an animal which includes joint stabilization and straight plane motion of the stretched anatomy about the stabilized joint.

12 Claims, 5 Drawing Sheets

JOINT STABILIZED STRAIGHT PLANE MOVEMENT STRETCHING METHOD

This United States Non-Provisional patent Application claims the benefit of U.S. Provisional Patent Application No. 61/192,054, filed Sep. 15, 2008, hereby incorporated by reference herein.

I. BACKGROUND

Generally, a joint stabilized planar motion stretching system for an animal. Specifically, a method of stretching an animal which includes joint stabilization and straight plane motion of the stretched anatomy about the stabilized joint.

Stretching can maintain joint flexibility and integrity, improve quality of movement and prevent injuries. However, with respect to animals such as dogs stretching can cause substantial injury if the articulated surfaces of the joints and the associated muscles which generate movement of the articulated surfaces and ligaments that provide joint stability are not stretched properly.

A substantial problem in stretching the muscles of an animal can be that there does not appear to be any known method prior to the inventive method of stabilizing the joints of a non-human animal to allow relaxation of the musculature associated with each type of joint. The failure to stabilize the joint can result in contraction of the muscles to protect the joint. The contracted muscle will may not allow the muscles, tendons and ligaments associated with a joint to be stretched. In some instances, attempts to stretch the contracted muscle may lead to injury of the joint or the associated musculature, tendons, or ligaments.

Another substantial problem in stretching the muscles of an animal can be that there does not appear to be any known method prior to the inventive method which protects the articulated surfaces of the joint and the associated soft tissue such as tendons and ligaments from injury due to rotation or side to side motion when stretched.

Each of these substantial problems is addressed by the joint stabilized planar motion stretching system described below.

II. SUMMARY OF THE INVENTION

Accordingly, a broad object of the invention can be to provide an effective method of stretching the muscles of an animal which avoids injury to the joint or associated musculature or associated tendons or ligaments.

Another broad object of the invention can be to provide a method of stabilizing the joint of an animal prior to stretching the musculature. One aspect of this object of the invention is to provide a method of stabilizing a variety of types of joints such as hinge joints such as the interphalangeal joints, ball and socket joints such shoulder and hip joints, and the vertebra of the neck.

Another broad object of the invention can be to provide a method of generating movement of the anatomy about the joint during stretching consistent with the configuration of the articulated surfaces of the joints and the stabilization forces of the ligamentous structures of the joints.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

Figure 1:
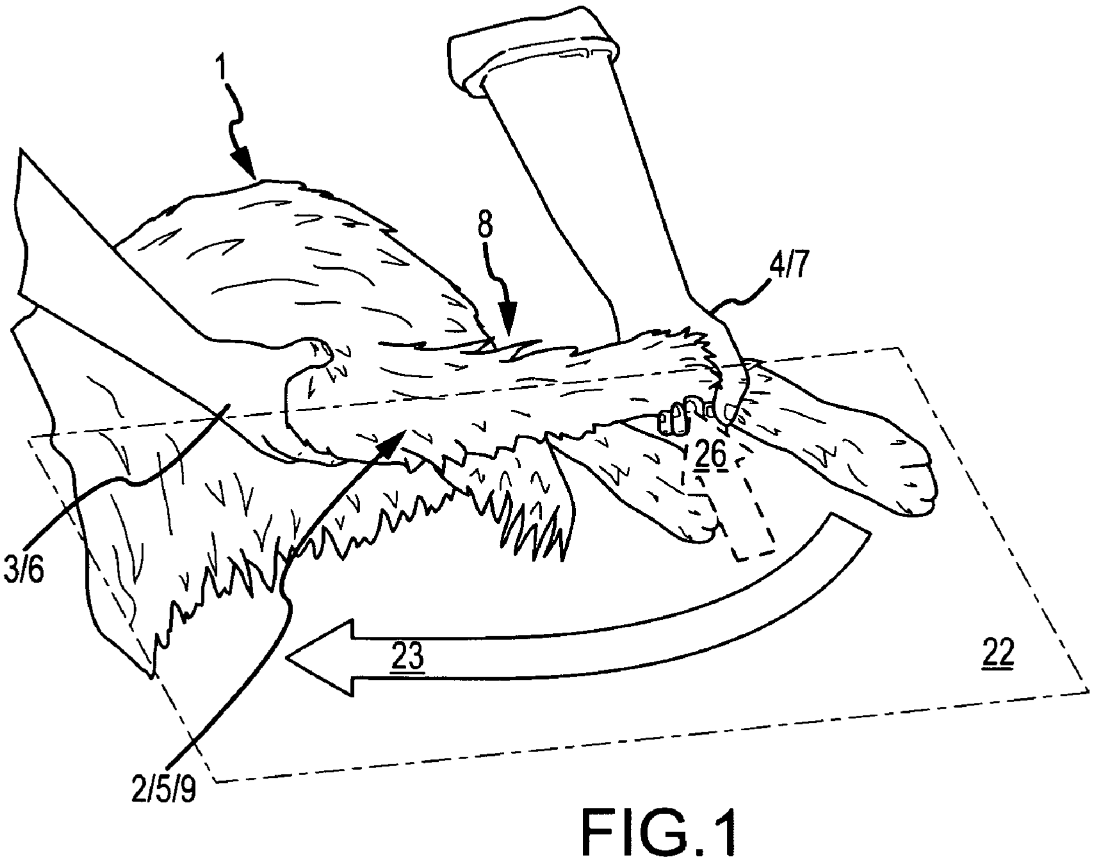
FIG. 1 illustrates a particular embodiment of the inventive method of stabilizing a hinge joint in the form of a knee joint of a dog.

Generally, a joint stabilized planar motion stretching system for an animal. Specifically, a method of stretching an animal which includes joint stabilization and straight plane motion of the stretched anatomy about the stabilized joint.

The joint stabilized planar motion stretching system comprises at least joint stabilization and straight plane movement of the anatomy about the stabilized joint (2) of an animal (1) to stretch the associated anatomy (the stretchable musculature, tendons, ligaments and other anatomical structures associated with the stabilized joint (2)). While the Figures provide examples of stabilization of joints (2) and straight plane motion to stretch the musculature associated with the stabilized joint in dogs, the invention is not so limited, and the joints (2) of any animal such as a human, a monkey, a dog, a cat, a rabbit, or the like can be stabilized for the purpose of performing joint stabilized planar motion stretching of the muscles about the joint (2).

In general, joint stabilization or the step of stabilizing a joint (2) comprises engagement of the animal (2) with a first hand (3) and the second hand (4) of the person performing the joint stabilization at locations on opposite sides of the joint (2) in which motion is to be generated to stretch the associated muscles or musculature of the animal (1). A wide variety of joints (2) can be stabilized for the purpose of performing joint stabilized planar motion stretching of the associated anatomy musculature.

Now referring primarily to FIG. 1, joint stabilization can be applied to joints (2) having articular surfaces configured to engage each other in a manner as to permit motion in substantially one plane (herein referred to as a "hinged joint" or "hinge joint"). Common examples of a hinge joint (5) are the interphalangeal joints and the joint between the humerus and ulna. The knee joint, ankle joint, and elbow joint are also examples of a hinge joint (5); however, these hinge joints (5) may allow a slight degree of rotation or side to side movement in certain positions of the limb of the animal (1). Stabilization of a hinge joint (5) (such as the knee joint of a dog as shown in FIG. 1), can be achieved by engaging the animal (1) with a first hand (3) at a location on a first side (6) of the hinge joint (5) to be stabilized and by further engaging the animal (2) with a second hand (4) at a location on a second side (7) of the hinge joint (5) to be stabilized.

With respect to a knee joint (9) of an animal (1), such as the knee joint (9) of a dog as shown in FIG. 1, the first hand (3) can hold a leg (8) of the animal (1) above the knee joint (9) and the second hand (4) can hold the leg (8) of the animal (1) below the knee joint (9). The engagement of the animal (1) with the first hand (3) and the second hand (4) on the corresponding first side (6) and the second side (7) of a hinge joint (5) (the handedness or engagement is not intended to be limiting) should be sufficient to allow forcible urging of the engaged parts of the animal (2) to an extent necessary to generate movement of the articular surfaces of the hinge joint (5) to stretch the associated anatomy.

Figure 4:
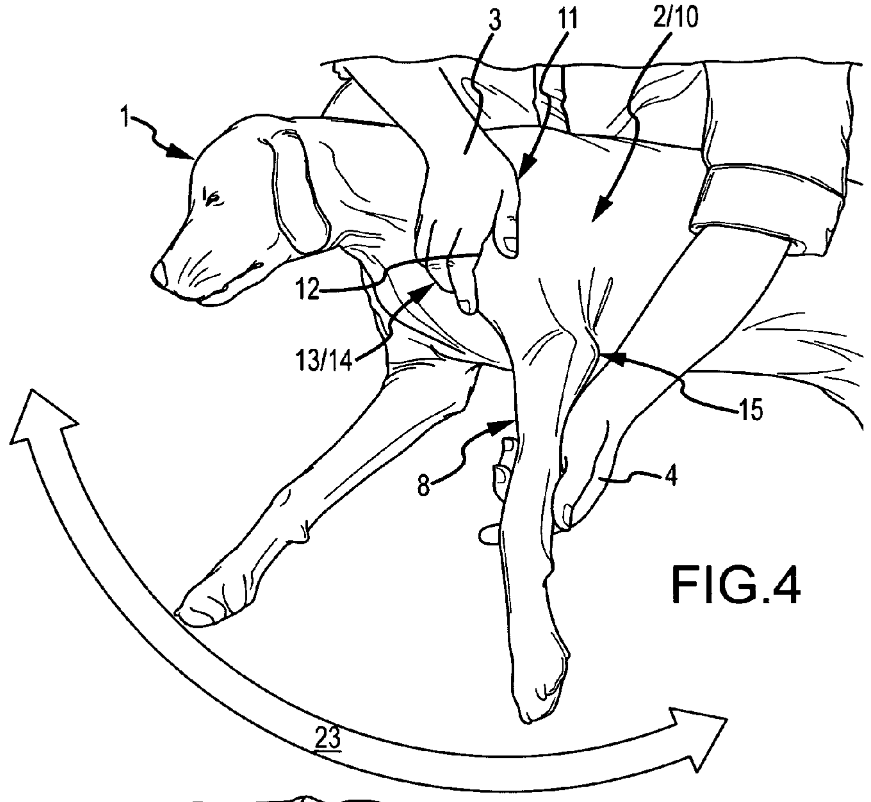
FIG. 4 illustrates a particular embodiment of the inventive method of stabilizing the front shoulder joint in the form of a front shoulder of a dog.

Now referring primarily to FIG. 4, certain joints (2) of an animal are not hinge joints (5), for example, two joints (2) of the dog, the shoulder joint (10) and hip joint (not shown) are not hinge joints (5). To stabilize the shoulder joint (10) or the hip joint of the dog (although the same stabilization steps can be applied to other species of animals), a palm (11) of the first hand (3) can press down on the scapula (12) and the fingers (13) of the first hand (3) can engageably wrap around the front of the shoulder (14) of the animal (1). The second hand (4) can grip the leg (8) of the dog below the elbow (15).

Figure 7:
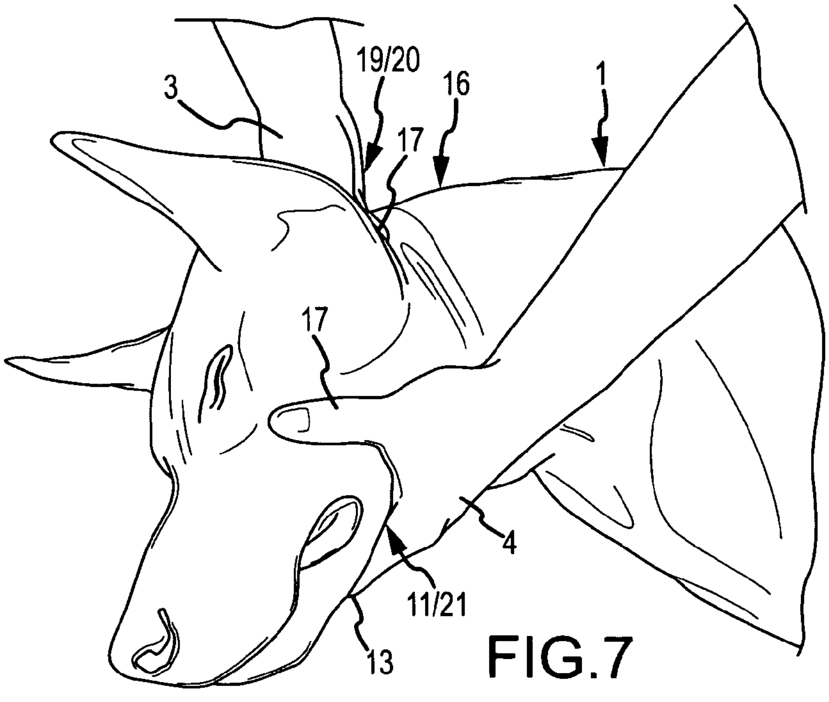
FIG. 7 illustrates a particular embodiment of the inventive method of joint stabilization of the vertebra of the neck in the form of a neck of a dog.

Now referring to FIG. 7, the neck (16) of an animal (1) can be stabilized by opening the thumb (17) and pointer finger (18) and engaging the neck (16) with the first hand (3) to cup (19) the base of the skull (20) of the animal (1). The palm (11) of the second hand (4) can be located beneath the jaw (21) of the animal (1) with the fingers (13) of the second hand (4) wrapped around the jaw (21).

It is not intended that the inventive joint stabilized planar motion stretching system be limited to these specific examples of joint stabilization or the step of stabilizing a joint, rather these specific examples of joint stabilization are intended to provide examples sufficient for the person of ordinary skill in the art to stabilize the same or similar types of joints in a wide variety of animals.

Figure 5:
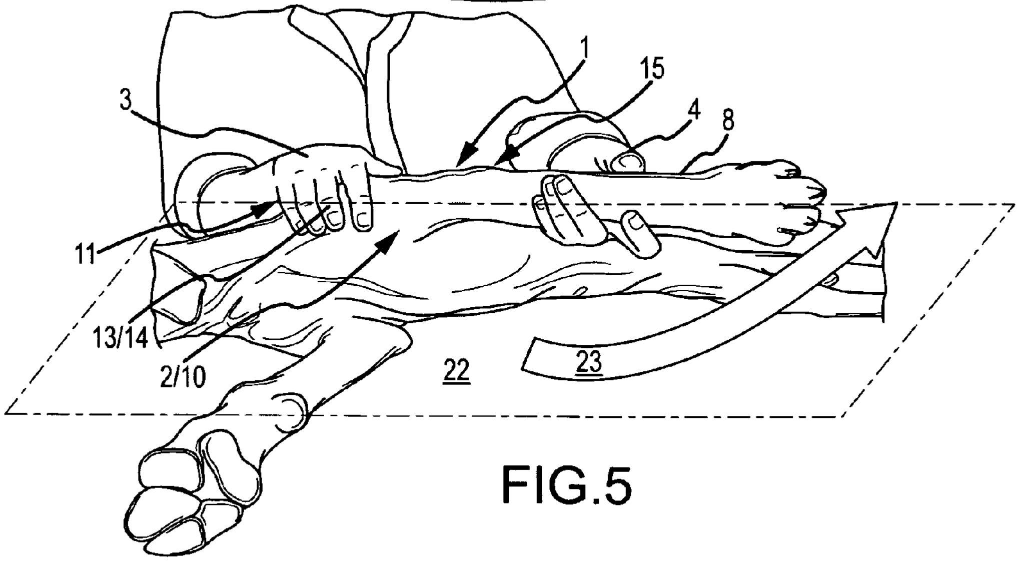
FIG. 5 illustrates a particular embodiment of the inventive method straight plane movement of the anatomy associated with the shoulder joint in the form of a front shoulder of a dog toward the rear.
Figure 6:
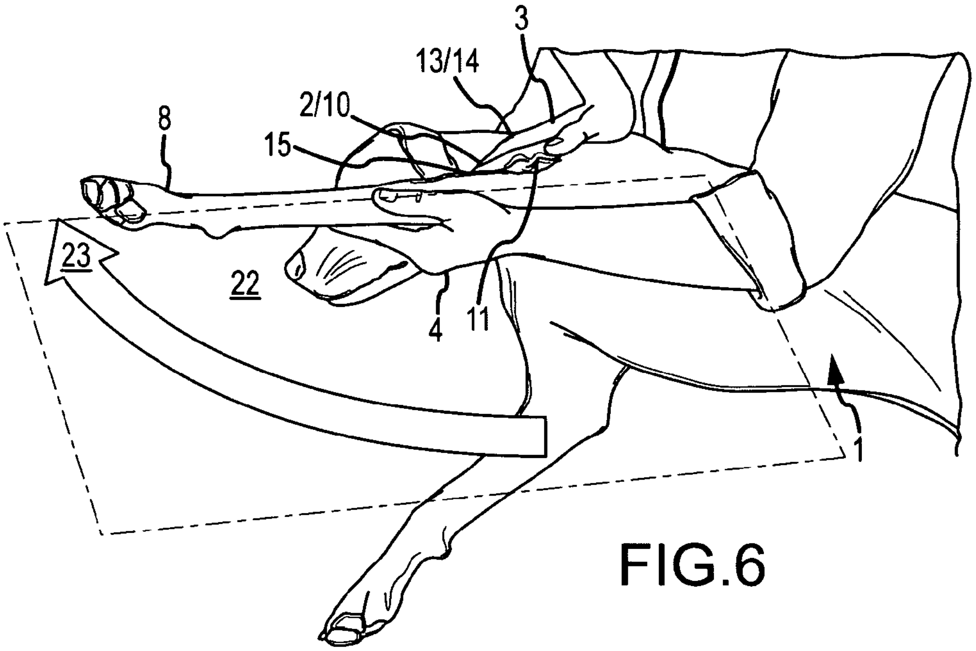
FIG. 6 illustrates a particular embodiment of the inventive method of straight plane movement of the anatomy associated with the shoulder joint in the form of a front shoulder of a dog toward the front.

Now referring primarily to FIGS. 1, 5 and 6, in general straight plane movement (23) (see for example the range of movement shown by FIGS. 5 and 6 by arrows in a one straight plane (22) (shown in broken lines)) of the stretched anatomy or the step stretching the anatomy in one straight plane (22) includes movement of the anatomy or anatomical structures of the animal (1) about the stabilized joint (1) in substantially one plane (22). The one straight plane (22) which defines the two dimensional space in which movement of the anatomical structures of the animal (1) about the stabilized joint (1) substantially occur (including a slight or normal amount of roll or side to side movement) during stretching by the inventive method can be defined by establishing one straight plane (22) in a fixed orientation which passes through the first hand (3) and the second hand (4) in the stabilized condition of the joint (2). The first hand (3) and the second hand (4) substantially maintain their spatial relationship to the surface of the one straight plane in the fixed orientation through out the straight plane movement (23) of the stretched anatomy. The orientation of the one straight plane (23) once fixed is not altered by movement of the first hand (3) or second hand (4) out of the surface of the one straight plane (22). Travel of the first hand (3) or second hand (4) off the surface of the one straight plane (as shown by the broken arrow (26) in FIG. 1) can result in excessive roll or side to side movement which can damage the joint (2) or the anatomy being stretched.

Movement of the stretched anatomy of the animal (1) in one straight plane (22) substantially avoids rotation or side to side movement in certain positions of the limb of the animal (1). Straight plane movement (23) of the stretched anatomy about the various types of stabilized joints above-described can be achieved by locating the first hand (3) and the second hand (4) engaging the animal (1) as above-described to stabilize the joint (2) in the same one plane in which movement of the anatomy of the animal (1) is to be moved about the joint (2). Movement of the anatomy of the animal (1) in one plane is then achieved by sufficient forcible urging of the anatomy of the animal (1) about the stabilized joint (2) by travel of either the first hand (3) or the second hand (4) in the one plane while the other of the first hand (3) or the second hand (4) remains substantially stationary. Straight plane movement of the anatomy continues until the musculature stretched affords slight resistance and the anatomy of the animal (1) is held at that location for a period of time in the preferred range of about 15 seconds to about 30 seconds. While this range may be preferred, the invention is not so limited and the period of time the stretched musculature is held at the location which affords slight resistance can be vary from no period of time to any period of time effective in stretching the anatomy (or bringing about the physiological effect of stretching of the anatomy) of a particular animal (1).

For the purposes of the present invention, ranges may be expressed as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The conventional definition of "about" will apply if no other specific definition is provided for the term "about" herein.

Figure 2:
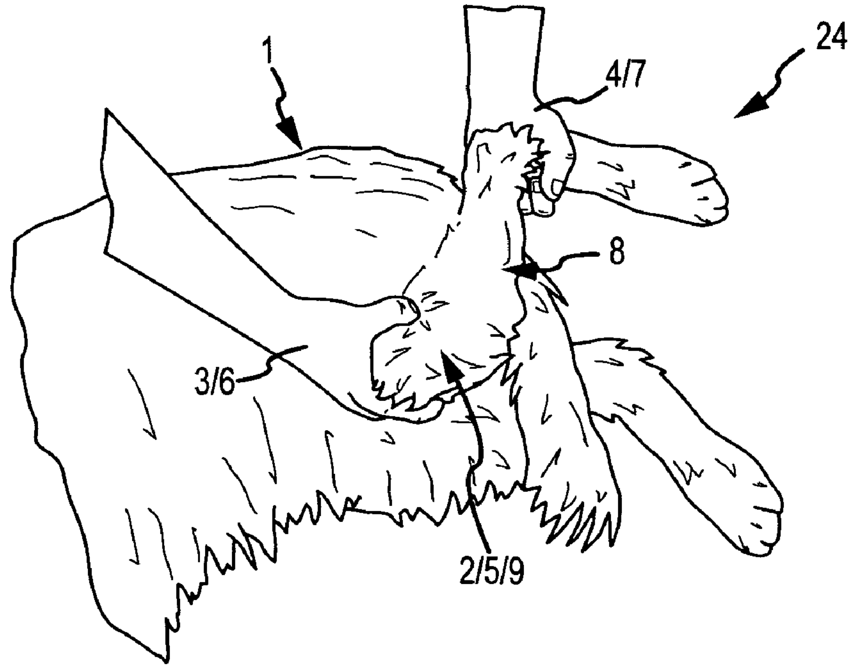
FIG. 2 illustrates a particular embodiment of the inventive method of straight plane movement to stretch the anatomy associated with a hinge joint in the form of a knee of a dog to the flexed condition.
Figure 3:
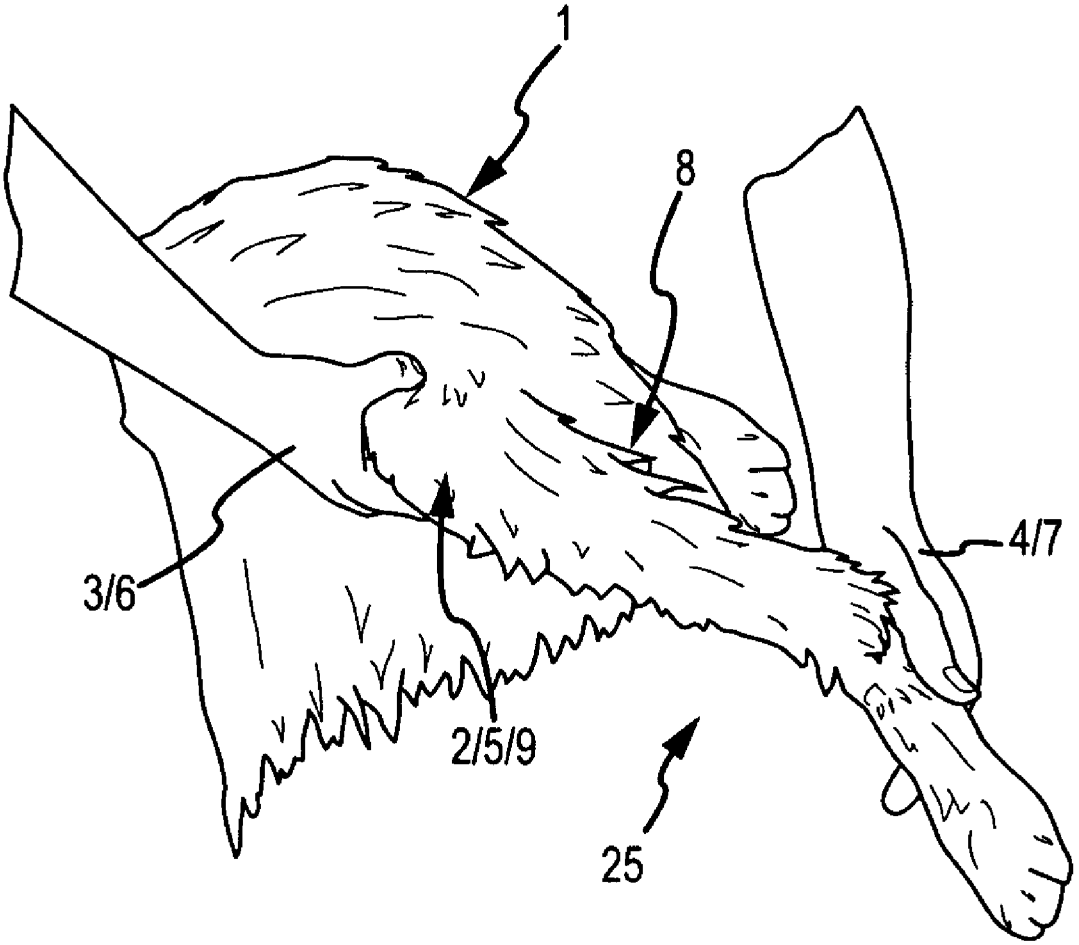
FIG. 3 illustrates a particular embodiment of the inventive method of straight plane movement to stretch the anatomy associated with a hinge joint in the form of a knee of a dog to the extended condition.

Now referring primarily to FIGS. 2 and 3, straight plane movement (23) of the anatomy of animal (1) about a hinge joint (5) such as a knee joint (9) stabilized as above-described can be accomplished by holding the first hand (3) engaging the animal (1) above the knee substantially stationary while using sufficient forcible urging with the second hand (4) engaging the animal (1) below the knee joint (9) with both hands located in the same plane to generate travel of the anatomy of the animal (1) below the knee (9) in substantially that one plane from a flexed condition (24) in which the limb is bent (see for example FIG. 2) toward an extended condition (25) in which the limb is extended outward a sufficient amount to stretch the associated anatomy until it affords slight resistance to urging by the second hand (4) (see for example FIG. 3). The extended condition (25) can be held for period of time as above-described and returned to the flexed condition (24).

Straight plane movement accomplished with a stabilized hinge joint (5) affords normal travel of the articulated surfaces of the hinge joint (5) without substantial rotation or side to side movement. Now referring specifically to FIG. 5, straight plane movement of a joint (2)(5) does not include substantial movement outside of the one plane first established by the location of the first hand (3) and the second hand (4) after the joint (2)(5) is stabilized (an example of improper movement outside of the straight plane is shown by the broken arrow). Substantial rotation of the hinged joint (5) outside of the straight plane movement during movement of the articular surfaces of the hinged joint is to be avoided and is not an element or any step of the inventive joint stabilized planar motion stretching system described herein.

Now referring primarily to FIGS. 5 and 6, which provides an example of straight plane movement about joints (2) which are not hinge joints (5) such as the shoulder joint (10) and the hip joint (not shown). Straight plane movement of a stabilized shoulder joint (10) (or hip joint or similar joint) of an animal (1) can be achieved by continuing to press down on the scapula (12) (or hold upper hip with the thumb over the hip joint and fingers wrapped around back of the hip to hold beneath the hock) with the palm (11) of the first hand (3) as above-described and maintain the first hand in a substantially stationary location. Establish the second hand (4) gripping the leg (8) below the elbow (15) in substantially one straight plane. Forcibly urging of the leg (8) with the second hand (4) can rotate the scapula (12) to allow travel in the leg (8) about the stabilized shoulder joint (10) toward the tail, as shown in FIG. 5. Continue straight plane movement of the leg (8) toward the rear of the animal until the musculature affords slight resistance. The leg (8) can be held at that location for a period of time as above-described. Similarly, the leg (8) can be rotated in straight plane movement about the stabilized scapula (12) toward the front of the animal (1) until the musculature affords slight resistance. The leg (8) can be held at that location for a period of time as above-described.

Figure 8:
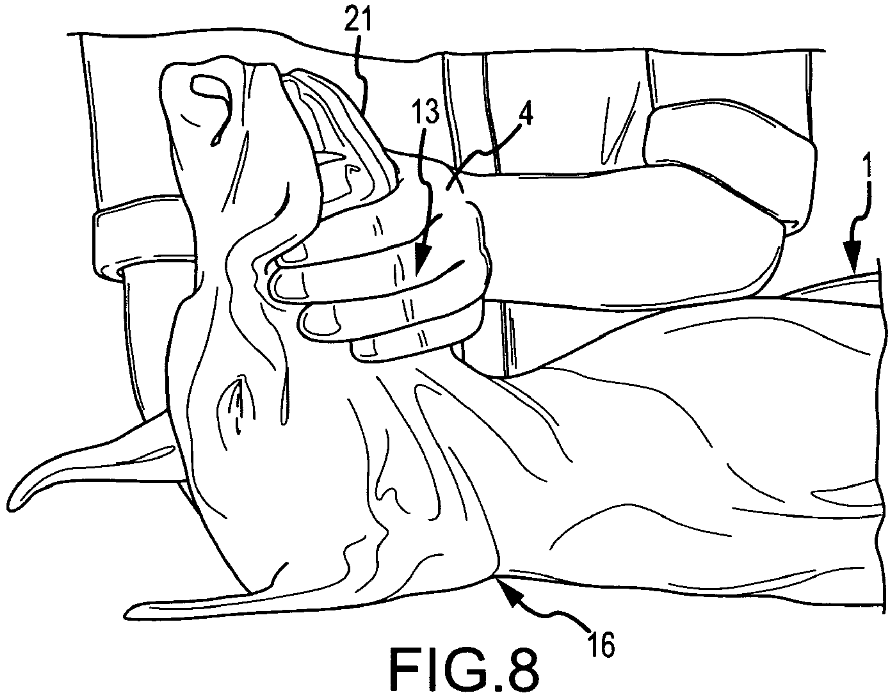
FIG. 8 illustrates a particular embodiment of the inventive method of straight plane movement of the anatomy in rotation of the vertebral column of the neck.
Figure 9:
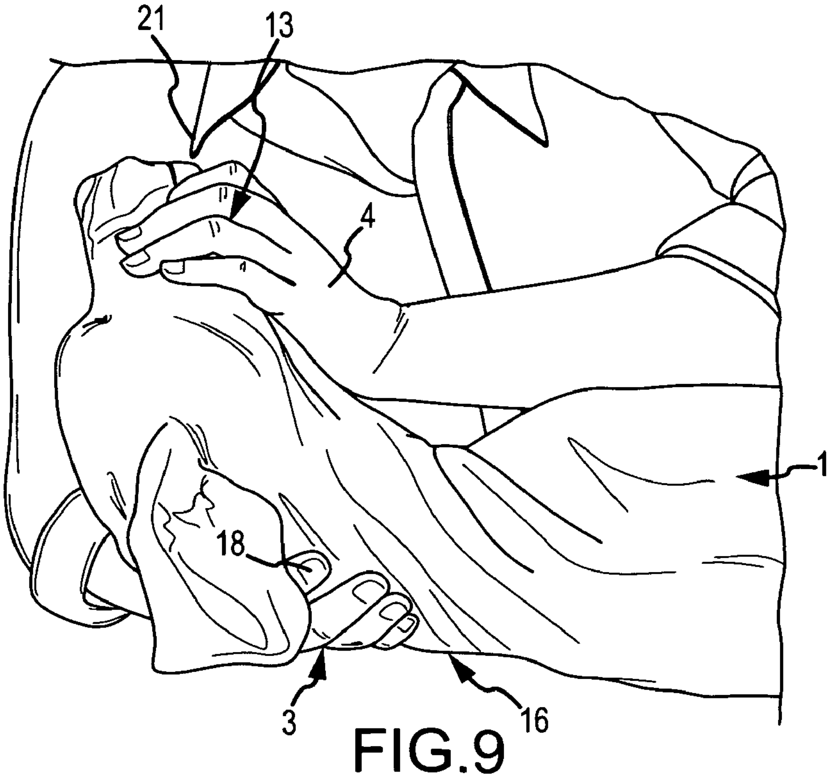
FIG. 9 illustrates a particular embodiment of the inventive method of straight plane movement of the anatomy in continued rotation of the vertebral column of the neck to stretch the muscles sufficiently to afford a slight resistance to straight plane movement.

Now referring primarily to FIGS. 7 through 9, which provides an example of straight plane movement about a stabilized neck (16) of an animal (1). Straight plane movement about the neck (16) can be achieved by continuing to stabilize the neck (16) with the first hand (3) and a second hand (4) as above-described and with the second hand (4) engaged beneath the jaw (21) forcibly urging to generate rotation of the jaw (21) in a single plane upward until the musculature affords slight resistance. The jaw (21) can be held at that location for a period of time as above-described.

As can be easily understood from the foregoing, the basic concepts of the present invention may be embodied in a variety of ways. The invention involves numerous and varied embodiments of the joint stabilized planar motion stretching system for an animal.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a stretch" should be understood to encompass disclosure of the act of "stretching"—whether explicitly discussed or not—and, conversely, were there effectively disclosure of the act of "stretching", such a disclosure should be understood to encompass disclosure of "a stretch" and even a "means for stretching" Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the joint stabilized planar motion stretching systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of stretching an animal, comprising the steps of:

a) providing an animal;

b) stabilizing a shoulder or a hip joint of said animal by pressingly engaging a palm of a first hand on said animal over said shoulder joint or said hip joint;

c) grippingly engaging a corresponding leg of said animal below an elbow or a knee with a second hand;

d generating straight plane movement of the anatomy of said animal about a stabilized joint, said pressing engagement of said first hand sufficient to allow movement of articular surfaces of said shoulder joint or said hip joint in substantially one plane; and e continuing straight plane movement to stretch the musculature of said stabilized joint of said animal.

2. The method of stretching an animal of claim 1, wherein said step of stabilizing a hinge joint of said animal comprises the steps of:

a) engaging said animal with a first hand at a location on a first side of said joint to be stabilized; and b) engaging said animal with a second hand at a location on a second side of said joint to be stabilized, engagement of said first hand and said second hand on opposite sides of said joint sufficient to allow movement of the articular surfaces of said joint in substantially one plane to stretch the musculature responsive to said joint.

3. The method of stretching an animal of claim 2, wherein said step of generating straight planar movement of the anatomy of said animal about a stabilized joint comprises the step of sufficient forcible urging of the anatomy of said animal about a stabilized hinge joint by travel of said second hand engaged at a second location on said second side of said stabilized hinge joint in the one plane while said first hand engaged at a location on said first side of said stabilized hinge joint remains substantially stationary.

4. The method of stretching an animal of claim 3, wherein said step of continuing straight plane movement to stretch the musculature of said stabilized joint of said animal comprises the step of continuing straight plane movement of the anatomy of said animal until the stretched musculature has a location which affords slight resistance to said straight plane movement.

5. The method of stretching an animal of claim 4, wherein said step of continuing straight plane movement to stretch the musculature of said stabilized joint of said animal comprises the step of continuing straight plane movement of the anatomy of said animal until the stretched musculature has a location which affords slight resistance to said straight plane movement.

6. The method of stretching an animal of claim 5, wherein said step of continuing straight plane movement to stretch the musculature of said stabilized joint of said animal comprises the step of continuing straight plane movement of the anatomy of said animal until the stretched musculature has a location which affords slight resistance to said straight plane movement.

7. The method of stretching an animal of claim 6, wherein said step of providing an animal comprises the step of providing an animal selected from the group of animals consisting of: a canid, a felid, an equid, a bovid, a cervid, a rodent, and a rabbit.

8. The method of stretching an animal of claim 1, wherein said step of generating straight planar movement of the anatomy of said animal about a stabilized joint comprises the step of sufficient forcible urging of the anatomy of said animal about a stabilized hip joint or shoulder joint by travel of said second hand grippingly engaged to said leg below said elbow in the one plane while said palm of said first hand pressingly engaged on said animal over said scapula of said stabilized hip joint or shoulder joint remains substantially stationary.

9. The method of stretching an animal of claim 8, wherein said step of continuing straight plane movement to stretch the musculature of said stabilized joint of said animal comprises the step of continuing straight plane movement of the anatomy of said animal until the stretched musculature has a location which affords slight resistance to said straight plane movement.

10. The method of stretching an animal of claim 9, wherein said step of continuing straight plane movement to stretch the musculature of said stabilized joint of said animal comprises the step of continuing straight plane movement of the anatomy of said animal until the stretched musculature has a location which affords slight resistance to said straight plane movement.

11. The method of stretching an animal of claim 10, further comprising the step of holding the anatomy of said animal at said location which affords slight resistance to said straight plane movement to stretch the musculature for a period of time in the range of about 15 seconds to about 30 seconds.

12. The method of stretching an animal of claim 11, wherein said step of providing an animal comprises the step of providing an animal selected from the group of animals consisting of: a canid, a felid, an equid, a bovid, a cervid, a rodent, and a rabbit.

* * * * *